(12) United States Patent
Pavan et al.

(10) Patent No.: US 7,801,404 B2
(45) Date of Patent: Sep. 21, 2010

(54) OPTICAL CABLE AND OPTICAL UNIT COMPRISED THEREIN

(75) Inventors: Massimiliano Pavan, Milan (IT); Giovanni Brandi, Milan (IT); Mauro Maritano, Milan (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 540 days.

(21) Appl. No.: 10/568,218

(22) PCT Filed: Aug. 28, 2003

(86) PCT No.: PCT/EP03/09728

§ 371 (c)(1),
(2), (4) Date: Aug. 26, 2008

(87) PCT Pub. No.: WO2005/022230

PCT Pub. Date: Mar. 10, 2005

(65) Prior Publication Data

US 2008/0304798 A1    Dec. 11, 2008

(51) Int. Cl.
*G02B 6/44* (2006.01)

(52) U.S. Cl. ............................. 385/100; 385/110

(58) Field of Classification Search .......... 385/100, 385/110
See application file for complete search history.

(56) References Cited

U.S. PATENT DOCUMENTS

| | | | |
|---|---|---|---|
| 4,612,155 A | 9/1986 | Wong et al. | |
| 4,617,366 A | 10/1986 | Gloriod et al. | |
| 4,644,044 A | 2/1987 | Gloriod et al. | |
| 4,909,593 A | 3/1990 | Harbort et al. | |
| 5,671,312 A | 9/1997 | Jamet | |
| 5,707,732 A | 1/1998 | Sonoda et al. | |
| 5,751,880 A | 5/1998 | Gaillard | |
| 6,035,087 A | 3/2000 | Bonicel et al. | |
| 6,205,276 B1 | 3/2001 | Anelli et al. | |
| 6,278,825 B1 * | 8/2001 | Casiraghi et al. | 385/100 |
| 6,329,054 B1 * | 12/2001 | Rogestedt et al. | 428/378 |
| 2002/0001440 A1 | 1/2002 | Bourget et al. | |

FOREIGN PATENT DOCUMENTS

| | | |
|---|---|---|
| DE | 40 09 101 A1 | 9/1991 |
| EP | 0 398 604 B1 | 11/1990 |
| EP | 0 774 487 A1 | 5/1997 |
| EP | 1 024 382 A2 | 8/2000 |
| EP | 1 106 648 A1 | 6/2001 |
| GB | 2 091 745 A | 8/1982 |
| WO | WO 01/21706 A1 | 3/2001 |
| WO | WO 02/08331 A2 | 1/2002 |
| WO | WO 03/046074 A1 | 6/2003 |

* cited by examiner

*Primary Examiner*—Charlie Peng
*Assistant Examiner*—Jerry Blevins
(74) *Attorney, Agent, or Firm*—Finnegan, Henderson, Farabow, Garrett & Dunner, L.L.P.

(57) ABSTRACT

Optical cable having at least one tubular element of polymeric material and at least one transmission element housed within said tubular element. The polymeric material is made from a polymeric composition having (a) at least one olefin polymer; (b) at least one inorganic filler; and (c) at least one olefin polymer including at least one functional group. The at least one olefin polymer including at least one functional group (c) is present in the polymeric composition in an amount of about 3 parts by weight to about 10 parts by weight, preferably about 5 parts by weight to about 8 parts by weight, with respect to 100 parts by weight of the olefin polymer (a).

67 Claims, 2 Drawing Sheets

OPTICAL CABLE AND OPTICAL UNIT COMPRISED THEREIN

CROSS REFERENCE TO RELATED APPLICATION

This application is a national phase application based on PCT/EP2003/009728, filed Aug. 28, 2003, the content of which is incorporated herein by reference.

BACKGROUND OF THE INVENTION

The present invention relates to an optical cable for telecommunication and/or for data transmission.

More in particular, the present invention relates to an optical cable comprising at least one tubular element of polymeric material and at least one transmission element housed within said tubular element, said polymeric material being made from a polymeric composition comprising at least one olefin polymer including at least one functional group.

Transmission elements, in particular coated optical fibers, used in optical cables are typically protected, either individually or as a group, by buffering materials or elements.

For instance, one or more optical fiber, group, bundle or ribbon of optical fibers, may be protected by a polymeric material in the form of a tube or of a flexible sheath. The optical fiber together with its protective element is generally referred to in the art as "optical unit". An optical cable may contain a single optical unit or a plurality of optical units. Said single or plurality of optical units is generally referred to as the optical core of the cable. The optical core is in turn typically inserted into a protecting polymeric sheath.

Usually, said polymeric material in the form of a tube or of a flexible sheath has a thin thickness and is endowed with specific mechanical properties so as to allow an easy access to the optical fibers in order to facilitate both the connection between the optical fibers and an user equipment or the interconnection between cables.

PRIOR ART

Efforts have been carried out in the art in order to improve the easy access to the optical fibers.

For example, U.S. Pat. No. 4,909,593 relates to an optical cable comprising several multiple-fiber optical units disposed within a tube made of a rigid, hardly shrinking plastic. Each of said unit consists of several optical fibers and of an envelope of soft plastic. Suitable plastics are thermoplastic elastomers vulcanizable at room temperature, or soft thermoplastic elastomers such as polyesteramide copolymers, soft ethylene-propylene copolymers, or a styrene-butadiene rubber. The abovementioned envelope of soft plastic is said to be easily removed with bare fingers.

European patent application 1,024,382 relates to a telecommunication cable element having a transmission element disposed in a buffer tube made from a thermoplastic polyolefin elastomer having a modulus of elasticity below 500 MPa at room temperature and a modulus of elasticity below 1500 MPa at −40° C. Examples of suitable elastomers are ethylene-propylene copolymers, preferably with more than 10 percent of ethylene monomer, terpolymers containing propylene-ethylene, ultra low density polyethylene or ethylene-octene copolymers, preferably containing more than 10% by weight of octene monomer. The elastomer can also contain inorganic fillers for controlling physical parameters, such as mechanical properties and flame retardancy. The abovementioned buffer tube is said to be easily strippable.

U.S. Pat. No. 5,671,312 relates to a cable comprising at least one module of fine conductors each covered with a primary sheath, the conductors being wrapped in a supporting sheath which provides mechanical coupling between the fine conductors and said fine conductors being coated with an oil having viscosity in the range of from 100 mPa·s to 5,000 mPa·s (100 cPo to 5,000 cPo). The abovementioned supporting sheath is said to be easily tearable.

U.S. Pat. No. 5,751,880 relates to an optical unit for an optical fiber telecommunication cable, the unit comprising a tube of plastics material in which at least one optical fiber is loosely received, wherein the thickness of said tube is less than or equal to 0.5 mm and wherein said material has a modulus of elasticity less than 1,500 MPa at 20° C. and a stress/elongation curve without a yield point. Said tube may be made of a material such as polyethylene, polypropylene, or polyvinyl chloride (PVC). The abovementioned tube is said to have a greatly reduced "memory" thereby facilitating splicing operations on stranded loose tube structure cables.

U.S. Pat. No. 6,035,087 relates to an optical unit for a fiber optic cable said unit comprising a plurality of optical fibers grouped in a tube, said tube having a Young's modulus less than 200 MPa and a Shore A hardness less than 90 at a temperature of approximately +20° C. and a Young's modulus less than 2,000 MPa at a temperature of approximately −40° C. Said tube is made of a polymer, for example a thermoplastic material such as plasticized polyvinylchloride. An elastomer may also be suitable. The abovementioned tube is said to have improved optical performance, mechanical strength and ease of access to the optical fibers.

U.S. patent application 2002/0001440 relates to a telecommunication cable module comprising at least one optical fiber surrounded by a protective skin of thermoplastic elastomer having flexible diol segment and, in particular, a polyester thermoplastic elastomer. Preferably, said thermoplastic elastomer has a melting point greater than 130° C. and an initial resistance to tearing less than 60 kN/m. The abovementioned protective skin is said to allow access to the fibers without using tools.

International patent application WO 01/21706 relates to a material forming thin films. Said material consists of a composition containing an olefin polymer and a filler ratio ranging between 25 wt % and 65 wt % of the composition, said material in undivided state having a tensile strength ranging between 6 MPa and 20 MPa and an elongation at break ranging between 50% and 300%. The abovementioned material is said to be particularly useful as a protective element (i.e. micromodule) for optical fiber and is said to allow an easy access to the fiber without using special tools.

As reported above, sometimes, inorganic fillers are preferably added to the polymeric materials in order to suitably modify their mechanical properties, in particular in order to reduce both their ultimate tensile strength and elongation at break, thus further improving the easy access to the optical fibers. Moreover, when inorganic fillers are added, coupling agents such as, for example, silanes or aminosilanes, may also be added to the polymeric material in order to enhance the compatibility between the inorganic fillers and the polymer materials. Nevertheless, according to Applicant's experience the use of the above disclosed polymeric materials in order to make a protective element of an optical fiber (e.g. a tube or a flexible sheath) may give rise to some drawbacks.

In particular, Applicant has noticed that, when inorganic fillers and coupling agents of silane or aminosilane types are present, said polymeric materials show low thermal stability. More in particular, said polymeric materials show a too high % variation (% D) (i.e., higher than ±10%) of the elongation at break upon thermal ageing. Consequently, as the protective element made therefrom may be deformed by thermal stresses, problems of increased attenuation due to microcurvatures of the optical fibers confined in the protective element may arise. Moreover, problems may arise also during the manufacturing process of said protective element, in particular, preventing a high extrusion speed and the achievement of a very thin thickness.

Moreover, Applicant has also noticed that when waterblocking fillers are inserted between the optical fibers and the protective element, such as for example a silicon oil, after the extrusion process, said polymeric materials show a too high elongation at break values (i.e., higher than 100%) thus preventing an easy access to the optical fiber by manual stripping.

The Applicant has now found that by using a polymeric material comprising at least one olefin polymer including at least one functional group as a coupling agent, it is possible to manufacture a protective element for optical fibers which not only is easy strippable and, consequently, allows an easy access to the optical fibers, but also is able to maintain its mechanical properties upon thermal ageing. Said polymeric material maintains its mechanical properties even after extrusion in the presence of waterblocking means. Moreover, said polymeric material may be extruded at high speed (e.g. 200 m/min) and at a very thin thickness without any problems.

SUMMARY OF THE INVENTION

According to a first aspect, the present invention thus relates to an optical cable comprising at least one tubular element of polymeric material and at least one transmission element housed within said tubular element, wherein said polymeric material is made from a polymeric composition comprising:

(a) at least one olefin polymer;

(b) at least one inorganic filler;

(c) at least one olefin polymer including at least one functional group;

wherein said at least one olefin polymer including at least one functional group (c) is present in the polymeric composition in an amount of from about 3 parts by weight to about 10 parts by weight, preferably from about 5 parts by weight to about 8 parts by weight, with respect to 100 parts by weight of the olefin polymer (a).

For the aim of the present description and of the claims which follows, the term "tubular element" is intended to include within its meaning any element which has or may be disposed in a tubular form within the cable structure. Examples of such tubular elements are buffer tubes suitable to house at least one transmission element or polymeric sheaths disposed to surround inner portions of an optical cable, e.g. one or more buffer tubes. Said polymeric sheath is preferably in the form of a tube (e.g. extruded about said inner portion) or alternatively can be a tape disposed about said inner portion (thus taking a tubular form), either helically wrapped or preferably folded along its longitudinal direction about said inner portion.

According to one preferred embodiment, said tubular element is a buffer tube which house said at least one transmission element. Preferably, said buffer tube is defined by a peripheral wall having a thickness lower than about 0.5 mm, preferably lower than about 0.2 mm, down to about 0.1 mm.

For the aim of the present description and of the claims which follows, said buffer tube housing said at least one transmission element has to be intended as an "optical unit". In one embodiment of the present invention, one or more "optical units" may be surrounded by said tubular element.

For the aim of the present description and of the claims which follows, said one or more "optical units" surrounded by said tubular element have to be intended as an "optical assembly".

According to a further preferred embodiment, said polymeric material has a ultimate tensile strength lower than about 12 MPa, preferably between about 5 MPa and about 10 MPa.

According to a preferred embodiment, said polymeric material has an elongation at break lower than about 100%, preferably between about 30% and about 80%.

According to one preferred embodiment the olefin polymer (a) may be selected from semi-crystalline or crystalline α-olefin polymers including homopolymers, copolymers, terpolymers, or mixtures thereof, containing one or more monomeric units. Polymers of α-olefins containing from 2 to about 20 carbon atoms, preferably from 2 to 8 carbon atoms, are preferred.

Specific examples of said α-olefins are: ethylene, propylene, 1-butene, 1-pentene, 4-methyl-1-pentene, 1-octene, 1-decene, 4-ethyl-1-hexene, or mixture thereof.

According to a further preferred embodiment, the olefin polymer (a) may be selected, for example, from: low density polyethylene (LDPE), high density polyethylene (HDPE), linear low density polyethylene (LLDPE), ultra low density polyethylene (ULDPE); polypropylene (including isotactic polypropylene); high and low density poly-1-butene; poly-4-methyl-1-pentene; ultra-low-molecular weight polyethylene; ethylene-based ionomers; poly-4-methyl-1-pentene; ethylene propylene copolymers; ethylene-propylene-diene copolymers (EPDM); copolymer of ethylene and/or propylene with other copolymerizable monomers such as, for example, ethylene-1-butylene copolymer, ethylene-vinyl acrylate copolymer, ethylene-methyl acrylate copolymer, ethylene-butyl acrylate copolymer, ethylene-ethyl acetate copolymer, ethylene-vinyl acetate copolymer, propylene-4-methyl-1-pentene copolymer, ethylene-vinyl alcohol copolymer; ethylene acrylic elastomers such as, for example, ethylene-methyl acrylate-acrylic acid terpolymers; or mixtures thereof. Halogenated olefins, polymers and copolymers, may also be used. Ethylene-butyl acrylate copolymer, linear low density polyethylene (LLDPE), or mixtures thereof, are preferred.

Examples of olefin polymer (a) which may be used according to the present invention and are available commercially are the product known by the name of Lotryl® from Atofina, Flexirene® from Polimeri Europa.

According to one preferred embodiment, the inorganic filler (b) may be selected, for example, from: hydroxides, hydrated oxides, salts or hydrated salts of metals, in particular of calcium, magnesium, or aluminum, or mixtures thereof. Said inorganic filler (b) may be used also in admixture with other inorganic fillers such as silicates.

According to a further preferred embodiment, the inorganic filler (b) may be selected, for example, from: magnesium hydroxide (including natural magnesium hydroxide, e.g. from the milled brucite mineral), aluminium hydroxide, aluminum oxide (including kaolin, i.e. an hydrated aluminum silicate), alumina trihydrate, magnesium carbonate hydrate, magnesium carbonate, magnesium calcium carbonate hydrate, magnesium calcium carbonate, or mixtures thereof. Magnesium hydroxide, aluminum hydroxide, alumina trihydrate ($Al_2O_3.3H_2O$), or mixtures thereof, are particularly preferred. Minor amounts, generally less than about 25% by weight, of one or more inorganic oxides or salts such as CoO, TiO₂, Sb₂O₃, ZnO, Fe₂O₃, CaCO₃ or mixtures thereof, may advantageously be added. The above mentioned metal hydroxides, in particular the magnesium and aluminum hydroxides, are preferably used in the form of particles with sizes which may range between about 0.1 μm and about 20 μm, preferably between about 0.5 μm and about 10 μm.

The inorganic filler (b) may be advantageously used in the form of coated particles. Coating materials preferably used are saturated or unsaturated fatty acids containing from 8 to 24 carbon atoms, or metal salts thereof, such as, for example: oleic acid, palmitic acid, stearic acid, isostearic acid, lauric acid; magnesium or zinc stearate or oleate; or mixtures thereof.

According to one preferred embodiment, the inorganic filler (b) is present in the polymeric composition of the present invention in an amount of from about 40 parts by weight to about 200 parts by weight, preferably from about 75 parts by weight to about 150 parts by weight, with respect to 100 parts by weight of the olefin polymer (a).

Examples of inorganic fillers (b) which may be used according to the present invention and are available commercially are the products known by the name of Hydrofy® from Sima or Atomfor® from Omya.

It has to be noted that the addition of the inorganic filler (b), particularly in amounts equal to or higher than about 100 parts by weight with respect to 100 parts by weight of the olefin polymer (a), may also confer advantageous flame retardant properties to the polymeric composition.

According to one preferred embodiment, the olefin polymer including at least one functional group (c) may be selected from:

($c_1$) at least one terpolymer of at least one α-olefin, at least one acrylic acid ester, and at least one α,β-olefinically unsaturated dicarboxylic acid reagent or its derivatives such as, for example, anhydrides, metal salts, imides, esters, or at least one glycidyl acrylate;

($c_2$) at least one terpolymer of ethylene, at least one α,β-olefinically unsaturated dicarboxylic acid anhydride, and at least one vinyl ester of a saturated carboxylic acid;

($c_3$) at least one olefin polymer grafted with at least one ethylenically unsaturated monomer.

According to one preferred embodiment, the terpolymer ($c_1$) may comprises from about 50% by weight to about 99% by weight of at least one α-olefin, from about 0.5% by weight to about 40% by weight of at least one acrylic acid ester, and from about 0.3% by weight to about 10% by weight of at least one dicarboxylic acid reagent or its derivatives, or of at least one glycidyl acrylate.

The α-olefin which may be advantageously used in the preparation of the terpolymer ($c_1$) may be selected, for example, from α-olefins containing from 2 to 2.0 carbon atoms, preferably from 2 to 8 carbon atoms. Ethylene, propylene, or mixture of ethylene and propylene, are preferred.

The acrylic acid esters which may be advantageously used in the preparation of the terpolymer ($c_1$) may be selected, for example, from compounds having the following formula:

$$CH_2=C(R)COOR'$$

wherein R represents hydrogen, or a lower alkyl group containing from 1 to 4 carbon atoms such as methyl or ethyl, and R' represents a lower alkyl group having from 1 to 6 carbon atoms.

Specific examples of the acrylic acid esters are: methyl acrylate, ethyl acrylate, butyl acrylate, methyl methacrylate, ethyl methacrylate, ethyl ethacrylate, or mixtures thereof.

The α,β-olefinically unsaturated dicarboxylic acid reagent or its derivatives which may be advantageously used in the preparation of the terpolymer ($c_1$) may be selected, for example, from: maleic acid, maleic anhydride, fumaric acid, mesaconic acid, itaconic acid, citraconic acid, itaconic anhydride, citraconic anhydride, monomethyl maleate, monosodium maleate, or mixtures thereof. Maleic anhydride is preferred.

The glycidyl acrylate which may be advantageously used in the preparation of the terpolymer ($c_1$) may be selected, for example, from compounds having the following formula:

wherein $R_1$ represents hydrogen or a lower alkyl group containing from 1 to 6 carbon atoms. Preferably, $R_1$ represents hydrogen, methyl, or ethyl.

Specific example of glycidyl acrylates are: glycidyl acrylate, glycidyl methacrylate, glycidyl ethacrylate, or mixtures thereof.

According to a preferred embodiment, the terpolymer ($c_1$) may be selected, for example, from: ethylene-methyl acrylate-maleic anhydride, ethylene-ethyl acrylate-maleic anhydride, ethylene-butyl acrylate-maleic anhydride, propylene-methyl acrylate-maleic anhydride, propylene-ethyl acrylate-maleic anhydride, ethylene-methyl acrylate-glycidyl methacrylate, ethylene-methyl acrylate-glycidyl acrylate, or mixtures thereof.

Terpolymers ($c_1$) which may be used according to the present invention may be prepared by known techniques such as, for example, by means of a high-pressure free radical polymerization process. A more detailed description of said processes may be found, for example, in U.S. Pat. No. 4,644,044 and U.S. Pat. No. 4,617,366, or in patent application GB 2,091,745.

Examples of terpolymers ($c_1$) which may be used according to the present invention and are available commercially are the products known by the name of Lotader® MAH, or Lotader® GMA from Atofina.

The α,β-olefinically unsaturated dicarboxylic acid anhydrides which may be advantageously used in the preparation of the terpolymer ($c_2$) may be selected from: citraconic anhydride, itaconic anhydride, tetrahydrophthalic anhydride, maleic anhydride, or mixture thereof. Maleic anhydride is preferred.

The vinyl ester of a saturated carboxylic acid which may be advantageously used in the preparation of the terpolymer ($c_2$) may be selected, for example, from vinyl ester of a saturated carboxylic acid containing from 2 to 6 carbon atoms. Vinyl acetate is preferred.

According to one preferred embodiment, the terpolymer ($c_2$) is ethylene-vinyl acetate-maleic anhydride.

Examples of terpolymers ($c_2$) which may be used according to the present invention and are available commercially are the products known by the name of Orevac® 9305, or Orevac® 9307 from Atofina.

With regard to the olefin polymer grafted with at least one ethylenically unsaturated monomer ($c_3$), the olefin polymer may be selected, for example, from: homopolymers of ethylene; homopolymers of propylene; copolymers of ethylene and propylene especially copolymers of propylene with minor amounts of ethylene as in impact and random copolymer of propylene; terpolymers of ethylene, propylene and dienes (e.g. so called EPDM); copolymers of ethylene with at least one $C_3$-$C_{10}$ hydrocarbon α-olefin; copolymers of ethylene and vinyl acetate, alkyl acrylate or alkyl methacrylate.

Specific examples of the $C_3$-$C_{10}$ hydrocarbon α-olefin are: butene-1, hexene-1, octene-1, or mixtures thereof.

Specific examples of the alkyl groups of the acrylates or methacrylates are: methyl, ethyl, propyl, butyl, or mixtures thereof.

The copolymers of ethylene may include both linear low density polyethylene (LLDPE) and very low density polyethylene (VLDPE).

The ethylenically unsaturated monomer may be selected, for example, from ethylenically unsaturated carboxylic acids or derivatives thereof, ethylenically unsaturated carboxylic acid anhydrides, or mixture thereof.

Specific examples of carboxylic acids, which may be selected from mono-, di- or polycarboxylic acids, are: acrylic acid, methacrylic acid, maleic acid, fumaric acid, itaconic acid, crotonic acid, or mixtures thereof.

Specific examples of anhydrides are: itaconic anhydride, maleic anhydride, substituted maleic anhydride (e.g. dimethyl maleic anhydride), nadic methyl anhydride, tetrahydrophthalic anhydride, or mixture thereof. Maleic anhydride is preferred.

Specific examples of unsaturated carboxylic acid derivatives are: salts, amides, imides or esters such as, for examples, mono- and disodium maleate, acrylamide, maleimide, glycidyl methacrylate, dimethyl fumarate, or mixture thereof.

Techniques for the grafting of such monomers onto the olefin polymers are known in the art and are described, for example, in U.S. Pat. No. 4,612,155, or in European Patent Application EP 398,604.

Examples of olefin polymers grafted with at least one ethylenically unsaturated monomer ($c_3$) which may be used according to the present invention and are available commercially are the products known by the name of Fusabond® from DuPont, or Orevac® G from Atofina.

The polymeric composition according to the present invention may advantageously comprises antioxidant additives, preferably selected among polymerized trimethyldihydroquinoline, 4,4'-thiobis(3-methyl-6-t-butyl)phenol; pentaerythrityl-tetrakis[3-(3,5-di-t-butyl-4-hydroxyphenyl)propionate], 2,2'-thiodiethylene-bis[3-(3,5-di-t-butyl-4-hydroxyphenyl)propionate], or mixtures thereof.

Other conventional additives, such as processing coadjuvants, lubricants, pigments, other fillers, may advantageously be added to the polymeric compositions according to the present invention.

Processing coadjuvants usually added to the polymeric composition are, for example, calcium stearate, zinc stearate, stearic acid, paraffin wax, silicone rubbers and the like, or mixtures thereof.

The polymeric composition according to the present invention may be prepared by mixing the polymer component(s), the filler and the additives optionally present according to techniques known in the art. The mixing can be carried out, for example, using an internal mixer of the type with tangential rotors (Banbury) or with interpenetrating rotors, or alternatively in continuous mixers such as Ko-Kneader (Buss) or co-rotating or counter-rotating twin-screw extruders.

Said polymeric composition may thus be applied as a tubular element as known in the art, for instance it may be extruded in the form of a buffer tube housing optical fibers.

As already reported above, the polymeric material forming the tubular element should preferably have both a reduced ultimate tensile strength and elongation at break in order to allow the installer to easily manually strip the element, e.g. without the risk of straining the optical fibers housed therein.

A buffer tube according to the present invention, made from a polymeric composition as above described, may thus be easily manually removed by an operator for gaining access to the optical fibers housed therein. In particular, the above polymeric composition allows an easy manual removal of the buffer tube not only at the respective ends of the buffer tube, but also at any intermediate location of the buffer tube (i.e. the so-called mid-span access).

Although the use of the above polymeric composition has been illustrated with specific reference to the manufacturing of buffer tubes apt to house at least one optical fiber within it, in particular having relatively thin containment wall, it may be understood that said polymeric composition may be used for manufacturing any polymeric tubular element, such as tubes or sheaths, in any kind of optical cable, which need to be easily removed by manual stripping. In particular, it may be appreciated that the present invention is directed to any tube or sheath made from said polymeric composition, and to any cable comprising said tube or sheath, whichever the dimensions of the tube or sheath and whichever the disposal of the tube or sheath within the cable structure.

BRIEF DESCRIPTION OF THE DRAWINGS

The present invention may be understood more clearly with reference to the following attached figures.

DETAILED DESCRIPTION OF THE PREFERRED EMBODIMENTS

Figure 1:
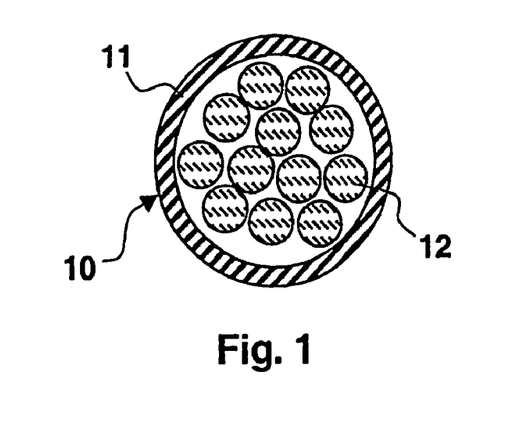
FIG. 1 shows an example of an optical unit according to the present invention.

FIG. 1 shows an example of an optical unit according to the present invention. In this embodiment, the optical unit 10 comprises a buffer tube 11 which envelopes a plurality of transmitting elements 12. The buffer tube 11 is made from a polymeric material as above defined. Transmission elements are preferably optical fibers which may be disposed inside the tube either individually, as ribbons or grouped into bundles. The optical fibers may be, for example, single-mode fibers, multi-mode fibers, dispersion-shifted (DS) fibers, non-zero dispersion (NZD) fibers, or fibers with a large effective area and the like, depending on the application requirements of the cable. They are generally fibers with an outside diameter of between about 230 µm and about 270 µm. If desired, some of the optical fibers housed inside said buffer tube may be replaced by non-transmitting glass fibers, in order to reach the optimal count within the tube, without varying the dimensions of the tube.

In a preferred embodiment, a buffer tube according to the present invention has an inner diameter which is slightly larger (typically lower than about 0.2 mm) than the outer diameter of the bundle of fibers housed therein, i.e. according to the so-called "semi-tight" or "near-tight" configuration. For instance, while a bundle of twelve optical fibers (each having a diameter of about 0.250 mm) has an outer diameter of about 1.05 mm, the inner diameter of the respective buffer tube housing said bundle of fibers will be of about 1.15 mm.

The buffer tube, in particular in the "near-tight" configuration, has preferably a thickness lower than about 0.2 mm, more preferably from about 0.05 mm to about 0.15 mm. Particularly preferred is a thickness of from about 0.075 mm to about 0.1 mm.

Figure 1A:
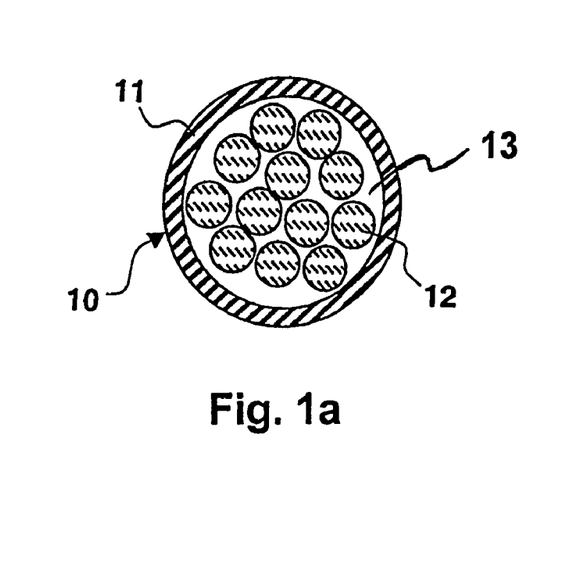
FIG. 1a shows a further example of an optical unit according to the present invention.

FIG. 1a shows a further example of an optical unit according to the present invention wherein a reference sign 10, 11 and 12 have the same meanings above reported as, the reference sign 13 represents a waterblocking filler. Said waterblocking filler 13 may be present in the buffer tube in the form of grease-like filler such as, for example, a silicon oil, or in the form of water swellable powder compositions such as, for example, a composition comprising a mixture of polyacrylate water swellable particles and inert talc particles, as described in International Patent Application Wo 00/58768, herein incorporated by reference. Preferably, said waterblocking filler 13 is a silicon oil having a viscosity in the range of about $1 \cdot 10^{-4}$ m$^2$/s and about $8 \cdot 10^{-3}$ m$^2$/s (about 100 cSt and about 8000 cSt), preferably in the range of about $5 \cdot 10^{-3}$ m$^2$/s and about $6 \cdot 10^{-3}$ m$^2$/s (about 5000 cSt and about 6000 cSt).

Figure 2:
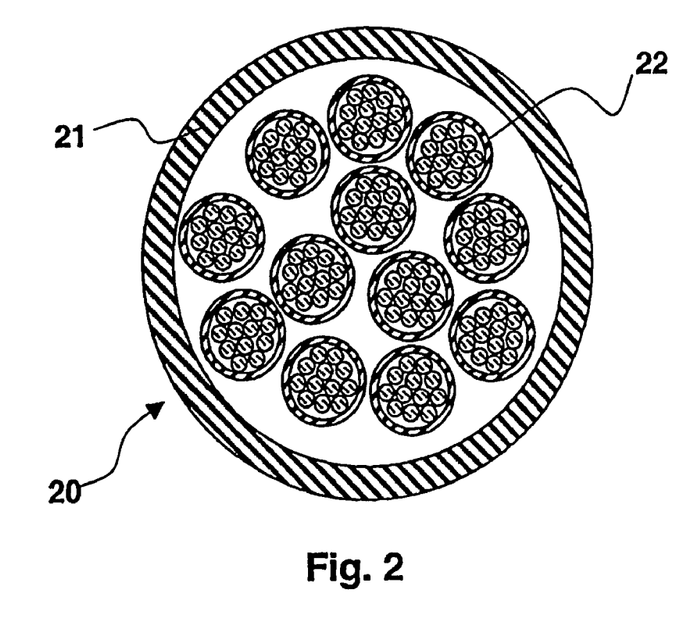
FIG. 2 shows an example of an optical assembly according to the present invention.

The optical unit illustrated in FIG. 1 and in FIG. 1a may be employed and installed as a sub-unit in an optical assembly such as, for example, the one represented in FIG. 2, or in an optical fiber cable.

According to one simple embodiment of the present invention, an optical cable consisting of an optical unit as defined in the above FIG. 1 or in FIG. 1a, wherein the buffer tube 11 is surrounded by a polymeric sheath (not shown in FIG. 1 or in FIG. 1a) of known materials (e.g. medium or high density polyethylene, MDPE or HDPE), may be made.

FIG. 2 shows an example of an optical assembly according to the present invention. Said optical assembly 20 comprises a polymeric sheath 21 made from a polymeric composition as above defined, which contains one or more optical units 22. Said optical units may comprise a buffer tube 23 of known materials (for instance polyethylene, ethylene-propylene copolymers, ethylene-vinylacetate copolymers or mixtures thereof) encircling the optical fibers or, preferably, the buffer tube is made from a polymeric material according to the present invention. The interstitial spaces between the optical units can be empty or preferably filled with a waterblocking material, such as for instance water swellable powders or water swellable yarns. The group of optical units can further be wrapped by a waterblocking tape, e.g. a tape of non-woven material comprising water absorbing particles. If desired, in particular when the optical assembly 20 is used as a telecommunication cable, i.e. without any further protective outer sheath, a couple of longitudinal reinforcing elements (not shown in FIG. 2) may be embedded in the polymeric sheath, similarly to the reinforcing elements 33 shown in FIG. 3. Optionally, in addition or alternatively to the above longitudinal reinforcing elements, additional strength member (not shown in FIG. 2), e.g. in the form of polymeric yarns (e.g. Kevlar®) may be disposed between said outer jacket and the bundle of units, totally or partially surrounding the bundle of units.

Depending on the number and dimensions of the optical units to be housed therein, the polymeric sheath forming the optical unit may have an outside diameter of between about 3 mm and about 25 mm and a thickness of between about 0.5 mm and about 3 mm. In more general terms, the expression "optical assembly" is referred to any tubular element housing at least one optical unit within it.

An optical assembly according to the present invention can be employed and installed either as such or as an element of an optical fiber cable.

Figures 3, 4:
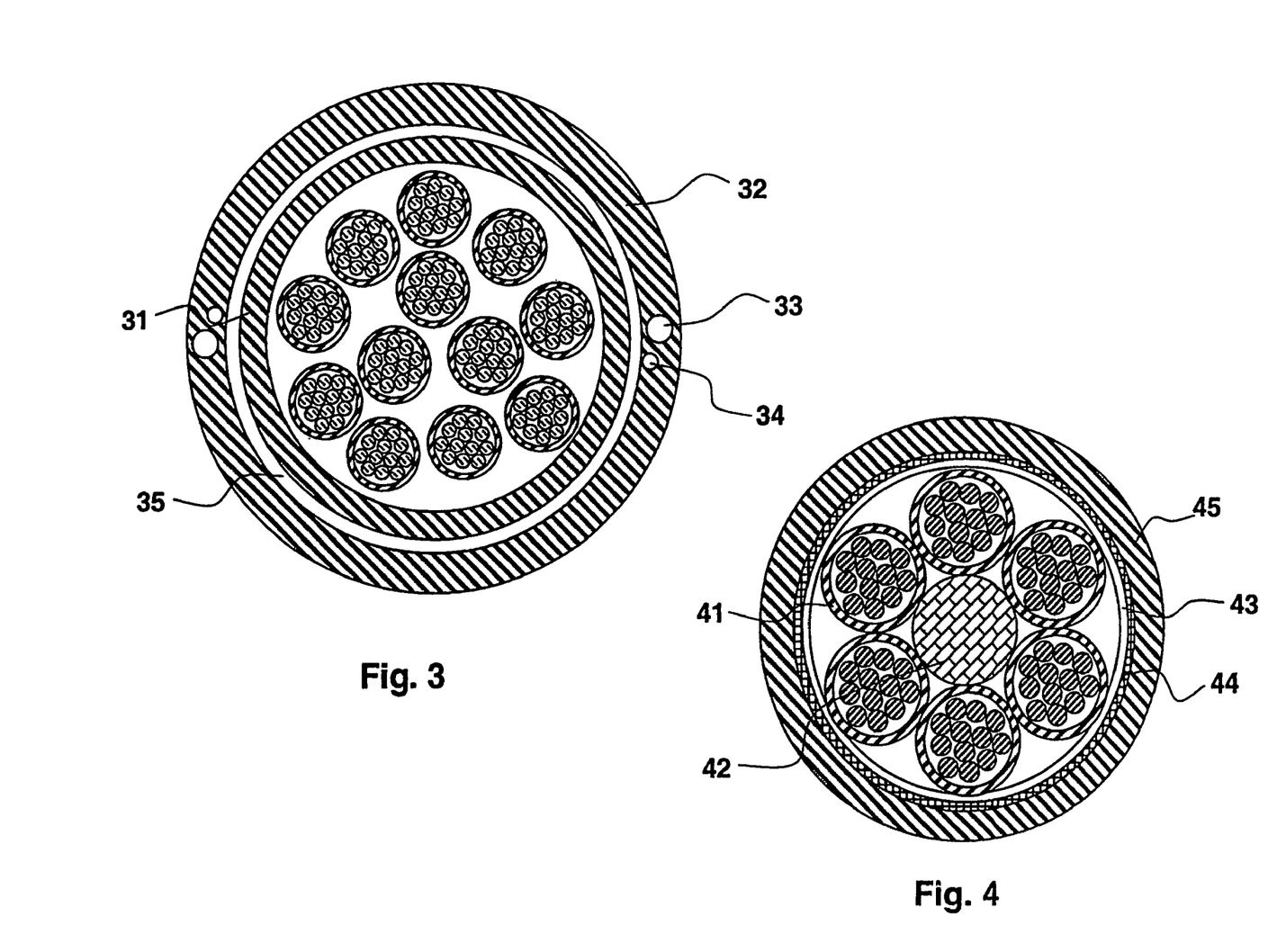
FIG. 3 shows an example of an optical cable according to the present invention.
FIG. 4 shows a further example of an optical cable according to the present invention.

An optical assembly can be used for instance in an optical cable according to FIG. 3, where said optical assembly 31 is surrounded by an outer polymeric jacket 32, made for instance from polyethylene (e.g. MDPE or HDPE), optionally with inorganic fillers added to optimize its flame resistance and its emission of fumes. The optical assembly 31 may comprise a polymeric sheath according to the present invention (e.g. like the optical assembly illustrated in FIG. 2) or, a polymeric sheath made from a conventional material. Said optical assembly may contain at least one optical unit according to the present invention, such as, for instance, the one illustrated in FIG. 1 or FIG. 1a. Alternatively, said optical assembly, may contain at least one optical unit comprising a buffer tube of known materials, as defined above. Reinforcing elements 33, for instance two GRP (glass reinforced polymer) rods, and optionally ripcords 34 are embedded in the outer jacket 32. A layer of non-stick material 35 is advantageously inserted between said outer sheath 32 and said optical unit 31, this layer preventing the sheath and the inner tube from sticking together during extrusion of the cable. This material is, for example, a paper tape.

Optionally, an additional strength member (not shown in FIG. 3), e.g. in the form of polymeric yarns (e.g. Kevlar®) is disposed between said outer jacket 32 and said tube 31.

Alternatively, as shown in FIG. 4, a plurality of optical units 41, either like the one illustrated in FIG. 1, FIG. 1a, or FIG. 2, can be stranded around a central strength member 42, e.g. a plastic coated metallic or GRP wire. The optical units are preferably arranged in an open helix pattern (or S-Z stranding) around the axis of the cable, i.e. the tubes are bundled around the axis of the cable in sections with a first direction of stranding (in S form), alternating with sections with an opposite direction of stranding (in Z form). The stranded optical units are optionally wrapped by a water blocking tape 43 and a layer 44 of high strength polymeric yarns (e.g. Kevlar®) is optionally disposed to surround the optical core. The cable is then protected by an outer jacket 45, e.g. of MDPE or HDPE. Optionally an inner polymeric sheath (not shown), e.g. of MDPE or HDPE, may be disposed between the waterblocking layer and the layer of polymeric yarns.

The present invention will be further illustrated below by means of a number of preparation examples, which are given for purely indicative purposes and without any limitation of this invention.

EXAMPLES 1-2

Preparation of Polymeric Compositions

Polymeric compositions were prepared by using the components as shown in Table 1 [(the amounts are expressed in phr, i.e. parts by weight per 100 parts of the olefin polymer (a)].

TABLE 1

| EXAMPLE | 1[(*)] | 2 |
|---|---|---|
| Lotryl ® 17BA07[(a)] | 70 | 70 |
| Lotryl ® 30BA02[(a)] | 10 | 10 |
| Flexirene ® CL10[(a)] | 20 | 20 |

TABLE 1-continued

| EXAMPLE | 1(*) | 2 |
|---|---|---|
| Lotader ® 3410 | — | 6 |
| Hydrofy ® GS1.5 | 100 | 100 |
| Rhodorsil ® GUM 901 | 4 | 4 |
| AMEO | 1.3 | — |
| Anox ® 20 | 1 | 1 |

(*)comparative;
(a)olefin polymer;
Lotryl ® 17BA07 (Atofina): copolymer ethylene-butyl acrylate containing 16% to 19% by weight of acrylic ester;
Lotryl ® 30BA02 (Atofina): copolymer ethylene-butyl acrylate containing 28% to 32% by weight of acrylic ester;
Flexirene ® CL10 (Polimeri Europa): linear low density polyethylene;
Lotader ® 3410 (Atofina): ethylene-n-butylacrylate-maleic anhydride terpolymer;
Hydrofy ® GS1.5 (Sima): magnesium hydroxide coated with stearic acid;
Rhodorsil ® GUM 901 (Rhodia): dimethylsiloxane, methyl vinyl terminated gum;
Dynasylan ® AMEO (Sivento-Chemie): 3-aminopropyl-triethoxysilane;
Anox ® 20 (Great Lakes Chemical): pentaerythrityl-tetrakis-[3-(3,5-di-t-butyl-4-hydroxyphenyl)-propionate] (antioxidant).

The composition were prepared by mixing the components as shown in Table 1, in a 8 litre Werner type closed mixer, having a volumetric packing ratio of about 0.74, with a water degassing cycle of 2 min, and subsequent addition of the antioxidant.

The mixtures were then granulated and the obtained granules were used for manufacturing buffer tubes containing twelve optical fibers (250 micron diameter each), said tubes having an outer diameter of about 1.4 mm and a thickness of about 0.12 mm, by using a tubing die with a draw down ratio of about 2. The line speed was set at about 200 m/min, the temperature of the polymeric composition at the exit from the extruder was of about 220° C. and the temperature of cooling water was about 20° C.

The buffer tubes were extruded both in the absence (dry) and in the presence of a Wacker silicone fluid AK from Wacker, a silicon oil having a viscosity of about $6 \cdot 10^{-3}$ m²/S (6000 cSt).

The buffer tubes have then been tested for measuring the ultimate tensile strength (TS) and the elongation at break (EB) according to ST/CNET/5843 standard from France Telecom, paragraph 7, pg. 5.

The obtained results are given in Table 2. In particular Table 2 shows the ultimate tensile strength (TS), the elongation at break (EB) and the % variation (% D) of said mechanical properties before (Starting Properties) and after thermal ageing.

As shown by the above table, the buffer tube obtained by a polymeric composition according to the present invention (Example 2) shows, both after extrusion in the absence (dry) and in the presence of silicon oil, a lower % variation (% D) of the elongation at break (Example 2) with respect to the buffer tube obtained by a polymeric composition wherein the compatibilization is achieved by means of a silane compound (Example 1). Moreover, when extruded in the presence of silicon oil, the buffer tube obtained from a polymeric composition wherein the compatibilization is achieved by means of a silane compound (Example 2) show a too high elongation at break. Consequently, the buffer tube of Example 2, was not subjected to thermal ageing.

The invention claimed is:

1. An optical cable comprising at least one tubular element of polymeric material and at least one transmission element housed within said tubular element, wherein said polymeric material is made from a polymeric composition comprising:
   (a) at least one olefin polymer;
   (b) at least one inorganic filler; and
   (c) at least one olefin polymer including at least one functional group;
   wherein said at least one olefin polymer including at least one functional group (c) is present in the polymeric composition in an amount of about 3 parts by weight to about 10 parts by weight with respect to 100 parts by weight of the olefin polymer (a),
   wherein said at least one tubular element is a buffer tube housing said at least one transmission element, and
   wherein said buffer tube is defined by a peripheral wall having a thickness lower than about 0.2 mm.

2. The optical cable according to claim 1, wherein said buffer tube is defined by a peripheral wall having a thickness down to about 0.1 mm.

3. The optical cable according to claim 1, wherein said polymeric material has an ultimate tensile strength lower than about 12 MPa.

4. The optical cable according to claim 1, wherein said polymeric material has an elongation at break lower than about 100%.

5. The optical cable according to claim 1, wherein the olefin polymer (a) is selected from semi-crystalline and crystalline α-olefin polymers including homopolymers, copolymers, terpolymers, and mixtures thereof, containing one or more monomeric units.

6. The optical cable according to claim 1, wherein the inorganic filler (b) is selected from hydroxides, hydrated oxides, salts and hydrated salts of metals, and mixtures thereof.

TABLE 2

| | STARTING PROPERTIES | | THERMAL AGEING (42 days at 80° C.) | | THERMAL AGEING (42 days at 42° C. and 93% of relative humidity) | | THERMAL AGEING (10 days in silicon oil at 70° C.) | |
|---|---|---|---|---|---|---|---|---|
| DRY | TS (MPa) | EB (%) | Δ% TS (MPa) | Δ% EB (%) | Δ% TS (MPa) | Δ% EB (%) | Δ% TS (MPa) | Δ% EB (%) |
| Example 1(*) | 7.4 | 53.2 | 8.1 | 35.3 | 1.3 | −0.7 | 5.4 | 50.4 |
| Example 2 | 9.7 | 41.1 | 9.3 | −6.3 | 2.0 | −1.2 | 3.1 | −2.7 |
| SILICON OIL | TS (MPa) | EB (%) | Δ% TS | Δ% EB | Δ% TS | Δ% EB | Δ% TS | Δ% EB |
| Example 1(*) | 7.9 | 221 | — | — | — | — | — | — |
| Example 2 | 8.6 | 62.4 | 1.1 | −0.6 | 3.5 | −12.0 | 3.4 | −9.0 |

(*)comparative.

7. The optical cable according to claim 1, wherein the olefin polymer including at least one functional group (c) is selected from:

(c$_i$) at least one terpolymer of at least one α-olefin, at least one acrylic acid ester, and at least one α,β-olefinically unsaturated dicarboxylic acid reagent or its derivatives, anhydrides, metal salts, imides, esters, or at least one glycidyl acrylate;

(c$_2$) at least one terpolymer of ethylene, at least one α,β-olefinically unsaturated dicarboxylic acid anhydride, and at least one vinyl ester of a saturated carboxylic acid; and (c$_3$) at least one olefin polymer grafted with at least one ethylenically unsaturated monomer.

8. An optical cable comprising at least one tubular element of polymeric material and at least one transmission element housed within said tubular element, wherein said polymeric material is made from a polymeric composition comprising:

(a) at least one olefin polymer;

(b) at least one inorganic filler; and (c) at least one olefin polymer including at least one functional group;

wherein said at least one olefin polymer including at least one functional group (c) is present in the polymeric composition in an amount of about 3 parts by weight to about 10 parts by weight with respect to 100 parts by weight of the olefin polymer (a), and wherein said polymeric material has an ultimate tensile strength lower than about 12 MPa.

9. The optical cable according to claim 8, wherein said tubular element is a buffer tube housing said at least one transmission element and wherein said buffer tube is defined by a peripheral wall having a thickness lower than about 0.5 mM.

10. The optical cable according to claim 8, wherein said polymeric material has an ultimate tensile strength of about 5 MPa to about 10 MPa.

11. The optical cable according to claim 8, wherein said polymeric material has an elongation at break lower than about 100%.

12. The optical cable according to claim 8, wherein the olefin polymer (a) is selected from semi-crystalline and crystalline α-olefin polymers including homopolymers, copolymers, terpolymers, and mixtures thereof, containing one or more monomeric units.

13. The optical cable according to claim 8, wherein the inorganic filler (b) is selected from hydroxides, hydrated oxides, salts and hydrated salts of metals, and mixtures thereof.

14. The optical cable according to claim 8, wherein the olefin polymer including at least one functional group (c) is selected from:

(c$_1$) at least one terpolymer of at least one α-olefin, at least one acrylic acid ester, and at least one α,β-olefinically unsaturated dicarboxylic acid reagent or its derivatives, anhydrides, metal salts, imides, esters, or at least one glycidyl acrylate;

(c$_2$) at least one terpolymer of ethylene, at least one α,β-olefinically unsaturated dicarboxylic acid anhydride, and at least one vinyl ester of a saturated carboxylic acid; and (c$_3$) at least one olefin polymer grafted with at least one ethylenically unsaturated monomer.

15. An optical cable comprising at least one tubular element of polymeric material and at least one transmission element housed within said tubular element, wherein said polymeric material is made from a polymeric composition comprising:

(a) at least one olefin polymer;

(b) at least one inorganic filler; and (c) at least one olefin polymer including at least one functional group;

wherein said at least one olefin polymer including at least one functional group (c) is present in the polymeric composition in an amount of about 3 parts by weight to about 10 parts by weight with respect to 100 parts by weight of the olefin polymer (a), and wherein said polymeric material has an elongation at break of about 30% to about 80%.

16. The optical cable according to claim 15, wherein said tubular element is a buffer tube housing said at least one transmission element and wherein said buffer tube is defined by a peripheral wall having a thickness lower than about 0.5 mM.

17. The optical cable according to claim 15, wherein said polymeric material has an ultimate tensile strength lower than about 12 MPa.

18. The optical cable according to claim 15, wherein the olefin polymer (a) is selected from semi-crystalline and crystalline α-olefin polymers including homopolymers, copolymers, terpolymers, and mixtures thereof, containing one or more monomeric units.

19. The optical cable according to claim 15, wherein the inorganic filler (b) is selected from hydroxides, hydrated oxides, salts and hydrated salts of metals, and mixtures thereof.

20. The optical cable according to claim 15, wherein the olefin polymer including at least one functional group (c) is selected from:

(c$_1$) at least one terpolymer of at least one α-olefin, at least one acrylic acid ester, and at least one α,β-olefinically unsaturated dicarboxylic acid reagent or its derivatives, anhydrides, metal salts, imides, esters, or at least one glycidyl acrylate;

(c$_2$) at least one terpolymer of ethylene, at least one α,β-olefinically unsaturated dicarboxylic acid anhydride, and at least one vinyl ester of a saturated carboxylic acid; and (c$_3$) at least one olefin polymer grafted with at least one ethylenically unsaturated monomer.

21. An optical cable comprising at least one tubular element of polymeric material and at least one transmission element housed within said tubular element, wherein said polymeric material is made from a polymeric composition comprising:

(a) at least one olefin polymer;

(b) at least one inorganic filler selected from hydroxides, hydrated oxides, salts or hydrated salts of metals, and mixtures thereof; and (c) at least one olefin polymer including at least one functional group;

wherein the inorganic filler (b) is present in the polymeric composition in an amount of about 75 parts by weight to about 150 parts by weight with respect to 100 parts by weight of the olefin polymer (a), and wherein said at least one olefin polymer including at least one functional group (c) is present in the polymeric composition in an amount of about 3 parts by weight to about 10 parts by weight with respect to 100 parts by weight of the olefin polymer (a).

22. The optical cable according to claim 21, wherein said at least one olefin polymer including at least one functional group (c) is present in the polymeric composition in an amount of about 5 parts by weight to about 8 parts by weight with respect to 100 parts by weight of the olefin polymer (a).

23. The optical cable according to claim 21, wherein said polymeric material has an ultimate tensile strength lower than about 12 MPa.

24. The optical cable according to claim 21, wherein said polymeric material has an elongation at break lower than about 100%.

25. The optical cable according to claim 21, wherein the olefin polymer (a) is selected from semi-crystalline and crystalline α-olefin polymers including homopolymers, copolymers, terpolymers, and mixtures thereof, containing one or more monomeric units.

26. The optical cable according to claim 25, wherein the α-olefin polymers contain from 2 to about 20 carbon atoms.

27. The optical cable according to claim 25, wherein the olefin polymer (a) is selected from low density polyethylene (LDPE), high density polyethylene (HDPE), linear low density polyethylene (LLDPE), ultra low density polyethylene (ULDPE), polypropylene, isotactic polypropylene, high and low density poly-1-butene, poly-4-methyl-1-pentene, ultra-low-molecular weight polyethylene, ethylene-based ionomers, poly-4-methyl-1-pentene, ethylene propylene copolymers, ethylene-propylene-diene copolymers (EPDM), copolymer of ethylene and/or propylene with other copolymerizable monomers, ethylene-1-butylene copolymer, ethylene-vinyl acrylate copolymer, ethylene-methyl acrylate copolymer, ethylene-butyl acrylate copolymer, ethylene-ethyl acetate copolymer, ethylene-vinyl acetate copolymer, propylene-4-methyl-1-pentene copolymer, ethylene-vinyl alcohol copolymer, ethylene acrylic elastomers, ethylene-methyl acrylate-acrylic acid terpolymers, and mixtures thereof.

28. The optical cable according to claim 21, wherein the inorganic filler (b) is selected from magnesium hydroxide, aluminum hydroxide, aluminum oxide, alumina trihydrate, magnesium carbonate hydrate, magnesium carbonate, magnesium calcium carbonate hydrate, magnesium calcium carbonate, and mixtures thereof.

29. The optical cable according to claim 21, wherein the inorganic filler (b) is in the form of coated particles.

30. The optical cable according to claim 29, wherein the inorganic filler (b) is coated with saturated or unsaturated fatty acids containing from 8 to 24 carbon atoms, or metal salts thereof.

31. The optical cable according to claim 21, wherein the olefin polymer including at least one functional group (c) is selected from:
($c_1$) at least one terpolymer of at least one α-olefin, at least one acrylic acid ester, and at least one α,β-olefinically unsaturated dicarboxylic acid reagent or its derivatives, anhydrides, metal salts, imides, esters, or at least one glycidyl acrylate;
($c_2$) at least one terpolymer of ethylene, at least one α,β-olefinically unsaturated dicarboxylic acid anhydride, and at least one vinyl ester of a saturated carboxylic acid; and
($c_3$) at least one olefin polymer grafted with at least one ethylenically unsaturated monomer.

32. The optical cable according to claim 31, wherein the terpolymer ($c_1$) comprises about 50% by weight to about 99% by weight of at least one α-olefin, about 0.5% by weight to about 40% by weight of at least one acrylic acid ester, and about 0.3% by weight to about 10% by weight of at least one dicarboxylic acid reagent, or of at least one glycidyl acrylate.

33. The optical cable according to claim 31, wherein in the terpolymer ($c_1$), the α-olefin is selected from α-olefins containing from 2 to about 20 carbon atoms.

34. The optical cable according to claim 31, wherein in the terpolymer ($c_1$) the acrylic acid ester is selected from compounds having the following formula:

wherein R represents hydrogen, or a lower alkyl group containing from 1 to 4 carbon atoms, methyl or ethyl, and R' represents a lower alkyl group having from 1 to 6 carbon atoms.

35. The optical cable according to claim 31, wherein in the terpolymer ($c_1$), the α,β-olefinically unsaturated dicarboxylic acid reagent or its derivatives are selected from maleic acid, maleic anhydride, fumaric acid, mesaconic acid, itaconic acid, citraconic acid, itaconic anhydride, citraconic anhydride, monomethyl maleate, monosodium maleate, and mixtures thereof.

36. The optical cable according to claim 31, wherein in the terpolymer ($c_1$), the glycidyl acrylate is selected from compounds having the following formula:

wherein $R_1$ represents hydrogen or a lower alkyl group containing from 1 to 6 carbon atoms.

37. The optical cable according to claim 31, wherein the terpolymer ($c_1$) is selected from ethylene-methyl acrylate-maleic anhydride, ethylene-ethyl acrylate-maleic anhydride, ethylene-butyl acrylate-maleic anhydride, propylene-methyl acrylate-maleic anhydride, propylene-ethyl acrylate-maleic anhydride, ethylene-methyl acrylate-glycidyl methacrylate, ethylene-methyl acrylate-glycidyl acrylate, and mixtures thereof.

38. The optical cable according to claim 31, wherein in the terpolymer ($c_2$), the α,β-olefinically unsaturated dicarboxylic acid anhydride is selected from citraconic anhydride, itaconic anhydride, tetrahydrophthalic anhydride, maleic anhydride, and mixtures thereof.

39. The optical cable according to claim 31, wherein in the terpolymer ($c_2$), the vinyl ester of a saturated carboxylic acid is selected from vinyl esters of a saturated carboxylic acid containing from 2 to 6 carbon atoms.

40. The optical cable according to claim 38, wherein the terpolymer ($c_2$) is ethylene-vinyl acetate-maleic anhydride.

41. The optical cable according to claim 31, wherein in the olefin polymer grafted with at least one ethylenically unsaturated monomer ($c_3$), the olefin polymer is selected from homopolymers of ethylene, homopolymers of propylene, copolymers of ethylene and propylene, terpolymers of ethylene, terpolymers of propylene, terpolymers of dienes (EPDM), copolymers of ethylene with at least one $C_3$-$C_{10}$ hydrocarbon α-olefin, and copolymers of ethylene and vinyl acetate, alkyl acrylate or alkyl methacrylate.

42. The optical cable according to claim 41, wherein the ethylenically unsaturated monomer is selected from ethylenically unsaturated carboxylic acids, derivatives thereof, ethylenically unsaturated carboxylic acid anhydrides, and mixtures thereof.

43. The optical cable according to claim 42, wherein the carboxylic acids are selected from acrylic acid, methacrylic acid, maleic acid, fumaric acid, itaconic acid, crotonic acid, and mixtures thereof.

44. The optical cable according to claim 42, wherein the anhydrides are selected from itaconic anhydride, maleic anhydride, substituted maleic anhydride, nadic methyl anhydride, tetrahydrophthalic anhydride, and mixtures thereof.

45. The optical cable according to claim 42, wherein the unsaturated carboxylic acid derivatives are selected from salts, amides, imides, esters, mono- and disodium maleate, acrylamide, maleimide, glycidyl methacrylate, dimethyl fumarate, and mixtures thereof.

46. An optical cable comprising at least one tubular element of polymeric material and at least one transmission element housed within said tubular element, wherein said polymeric material is made from a polymeric composition comprising:
   (a) at least one olefin polymer;
   (b) at least one inorganic filler; and
   (c) at least one olefin polymer including at least one functional group selected from:
      ($c_1$) at least one terpolymer of at least one α-olefin, at least one acrylic acid ester, and at least one α,β-olefinically unsaturated dicarboxylic acid reagent or its derivatives, anhydrides, metal salts, imides, esters, or at least one glycidyl acrylate; and
      ($c_2$) at least one terpolymer of ethylene, at least one α,β-olefinically unsaturated dicarboxylic acid anhydride, and at least one vinyl ester of a saturated carboxylic acid; and
   wherein said at least one olefin polymer including at least one functional group (c) is present in the polymeric composition in an amount of about 3 parts by weight to about 10 parts by weight with respect to 100 parts by weight of the olefin polymer (a).

47. The optical cable according to claim 46, wherein said at least one olefin polymer including at least one functional group (c) is present in the polymeric composition in an amount of about 5 parts by weight to about 8 parts by weight with respect to 100 parts by weight of the olefin polymer (a).

48. The optical cable according to claim 46, wherein said polymeric material has an ultimate tensile strength lower than about 12 MPa.

49. The optical cable according to claim 46, wherein said polymeric material has an elongation at break lower than about 100%.

50. The optical cable according to claim 46, wherein the olefin polymer (a) is selected from semi-crystalline and crystalline α-olefin polymers including homopolymers, copolymers, terpolymers, and mixtures thereof, containing one or more monomeric units.

51. The optical cable according to claim 50, wherein the α-olefin polymers contain from 2 to about 20 carbon atoms.

52. The optical cable according to claim 50, wherein the olefin polymer (a) is selected from low density polyethylene (LDPE), high density polyethylene (HDPE), linear low density polyethylene (LLDPE), ultra low density polyethylene (ULDPE), polypropylene, isotactic polypropylene, high and low density poly-1-butene, poly-4-methyl-1-pentene, ultra-low-molecular weight polyethylene, ethylene-based ionomers, poly-4-methyl-1-pentene, ethylene propylene copolymers, ethylene-propylene-diene copolymers (EPDM), copolymer of ethylene and/or propylene with other copolymerizable monomers, ethylene-1-butylene copolymer, ethylene-vinyl acrylate copolymer, ethylene-methyl acrylate copolymer, ethylene-butyl acrylate copolymer, ethylene-ethyl acetate copolymer, ethylene-vinyl acetate copolymer, propylene-4-methyl-1-pentene copolymer, ethylene-vinyl alcohol copolymer, ethylene acrylic elastomers, ethylene-methyl acrylate-acrylic acid terpolymers, and mixtures thereof.

53. The optical cable according to claim 46, wherein the inorganic filler (b) is selected from hydroxides, hydrated oxides, salts and hydrated salts of metals, and mixtures thereof.

54. The optical cable according to claim 53, wherein the inorganic filler (b) is selected from magnesium hydroxide, aluminum hydroxide, aluminum oxide, alumina trihydrate, magnesium carbonate hydrate, magnesium carbonate, magnesium calcium carbonate hydrate, magnesium calcium carbonate, and mixtures thereof.

55. The optical cable according to claim 53, wherein the inorganic filler (b) is in the form of coated particles.

56. The optical cable according to claim 55, wherein the inorganic filler (b) is coated with saturated or unsaturated fatty acids containing from 8 to 24 carbon atoms, and metal salts thereof.

57. The optical cable according to claim 53, wherein the inorganic filler (b) is present in the polymeric composition in an amount of about 40 parts by weight to about 200 parts by weight with respect to 100 parts by weight of the olefin polymer (a).

58. The optical cable according to claim 57, wherein the inorganic filler (b) is present in the polymeric composition in an amount of about 75 parts by weight to about 150 parts by weight with respect to 100 parts by weight of the olefin polymer (a).

59. The optical cable according to claim 46, wherein the terpolymer ($c_1$) comprises about 50% by weight to about 99% by weight of at least one α-olefin, about 0.5% by weight to about 40% by weight of at least one acrylic acid ester, and about 0.3% by weight to about 10% by weight of at least one dicarboxylic acid reagent, or of at least one glycidyl acrylate.

60. The optical cable according to claim 46, wherein in the terpolymer ($c_1$), the α-olefin is selected from α-olefins containing from 2 to about 20 carbon atoms.

61. The optical cable according to claim 46, wherein in the terpolymer ($c_1$), the acrylic acid ester is selected from compounds having the following formula:

wherein R represents hydrogen, or a lower alkyl group containing from 1 to 4 carbon atoms, methyl or ethyl, and R' represents a lower alkyl group having from 1 to 6 carbon atoms.

62. The optical cable according to claim 46, wherein in the terpolymer ($c_1$), the α,β-olefinically unsaturated dicarboxylic acid reagent or its derivatives are selected from maleic acid, maleic anhydride, fumaric acid, mesaconic acid, itaconic acid, citraconic acid, itaconic anhydride, citraconic anhydride, monomethyl maleate, monosodium maleate, and mixtures thereof.

63. The optical cable according to claim 46, wherein in the terpolymer ($c_1$), the glycidyl acrylate is selected from compounds having the following formula:

wherein $R_1$ represents hydrogen or a lower alkyl group containing from 1 to 6 carbon atoms.

64. The optical cable according to claim 46, wherein the terpolymer ($c_1$) is selected from ethylene-methyl acrylate-maleic anhydride, ethylene-ethyl acrylate-maleic anhydride, ethylene-butyl acrylate-maleic anhydride, propylene-methyl acrylate-maleic anhydride, propylene-ethyl acrylate-maleic anhydride, ethylene-methyl acrylate-glycidyl methacrylate, ethylene-methyl acrylate-glycidyl acrylate, and mixtures thereof.

65. The optical cable according to claim 46, wherein in the terpolymer ($c_2$), the $\alpha,\beta$-olefinically unsaturated dicarboxylic acid anhydride is selected from citraconic anhydride, itaconic anhydride, tetrahydrophthalic anhydride, maleic anhydride, and mixtures thereof.

66. The optical cable according to claim 46, wherein in the terpolymer ($c_2$), the vinyl ester of a saturated carboxylic acid is selected from vinyl esters of a saturated carboxylic acid containing from 2 to 6 carbon atoms.

67. The optical cable according to claim 65, wherein the terpolymer ($c_2$) is ethylene-vinyl acetate-maleic anhydride.

\* \* \* \* \*

UNITED STATES PATENT AND TRADEMARK OFFICE
CERTIFICATE OF CORRECTION

PATENT NO. : 7,801,404 B2  
APPLICATION NO. : 10/568218  
DATED : September 21, 2010  
INVENTOR(S) : Pavan et al.

Page 1 of 1

It is certified that error appears in the above-identified patent and that said Letters Patent is hereby corrected as shown below:

Title Page, Item (73), in the Assignee, lines 1-2,
"Prysmian Cavi E Sistemi Energia S.R.L.," should read
--Prysmian Cavi e Sistemi Energia S.r.l.--.

Claim 9, column 13, lines 35-36, "0.5 mM." should read --0.5 mm.--.

Claim 16, column 14, lines 20-21, "0.5 mM." should read --0.5 mm.--.

Signed and Sealed this

Twenty-seventh Day of September, 2011

David J. Kappos
*Director of the United States Patent and Trademark Office*